United States Patent [19]
Kishimoto et al.

[11] Patent Number: 5,513,108
[45] Date of Patent: Apr. 30, 1996

[54] SYSTEM FOR CONTROLLING SUSPENSION IN ACCORDANCE WITH ROAD CONDITIONS

[75] Inventors: Naohiro Kishimoto; Hiroaki Yoshida, both of Okazaki; Kiichi Yamada, Nagoya, all of Japan

[73] Assignee: Mitsubishi Jidosha Kogyo Kabushiki Kaisha, Tokyo, Japan

[21] Appl. No.: 16,978

[22] Filed: Feb. 12, 1993

[30] Foreign Application Priority Data

Feb. 14, 1992 [JP] Japan ................. 4-028398

[51] Int. Cl.$^6$ .................................................. B60G 17/00
[52] U.S. Cl. .................... 364/424.05; 280/707; 280/840; 395/900
[58] Field of Search ............... 364/424.05; 280/840, 280/6.11, 688, 707, DIG. 1; 395/900, 905

[56] References Cited

U.S. PATENT DOCUMENTS

| | | | |
|---|---|---|---|
| 4,761,022 | 8/1988 | Ohashi et al. | 280/707 X |
| 4,937,748 | 6/1990 | Yonekawa et al. | 364/424.05 |
| 4,961,595 | 10/1990 | Fukushima et al. | 280/707 X |
| 5,013,062 | 5/1991 | Yonekawa et al. | 280/707 |
| 5,066,041 | 11/1991 | Kindermann et al. | 364/424.05 X |
| 5,104,143 | 4/1992 | Yonekawa | 280/707 |
| 5,138,554 | 8/1992 | Wada | 364/424.05 |
| 5,159,555 | 10/1992 | Wada | 364/424.05 |
| 5,177,681 | 1/1993 | Sato | 364/424.05 |
| 5,204,815 | 4/1993 | Yamamoto | 364/424.05 |

FOREIGN PATENT DOCUMENTS

| | | |
|---|---|---|
| 0246655 | 11/1987 | European Pat. Off. . |
| 0306004 | 3/1989 | European Pat. Off. . |
| 0344493 | 12/1989 | European Pat. Off. . |
| 0348634 | 1/1990 | European Pat. Off. . |
| 0348817 | 1/1990 | European Pat. Off. . |
| 0364965 | 4/1990 | European Pat. Off. . |
| 3609396 | 3/1986 | Germany . |
| 4017222 | 5/1990 | Germany . |
| 3-139409 | 6/1991 | Japan . |
| 3-208712 | 9/1991 | Japan . |
| 3-208713 | 9/1991 | Japan . |
| 2155207 | 9/1985 | United Kingdom . |

*Primary Examiner*—Collin W. Park

[57] ABSTRACT

A suspension system includes air suspensions provided for individual wheels of a motor vehicle, each including a damping force switching actuator and an air supply/discharge actuator for the air spring. It further includes sensor for detecting the steering angle of a steering wheel, a sensor for detecting the vehicle velocity, and a control device for controlling the damping force and spring constant of each air suspension in accordance with the values detected by means of the sensors. This thereby reduces the roll of the vehicle body and modifies the steering characteristic of the motor vehicle. The control device includes a controller for detecting the gradient and flexure degree of a road. It further includes a controller for discriminating the road conditions by fuzzy inference in accordance with the gradient and flexure degree, and for determining the delay time or time interval between the start of the roll control for the rear portion of the vehicle body and the start of the roll control for the front portion of the vehicle body in accordance with the result of the discrimination.

24 Claims, 7 Drawing Sheets

SYSTEM FOR CONTROLLING SUSPENSION IN ACCORDANCE WITH ROAD CONDITIONS

BACKGROUND OF THE INVENTION

1. Field of the Invention

The present invention relates to a suspension system of a motor vehicle for supporting a vehicle body on each axle.

2. Description of the Related Art

A suspension system comprises suspensions which are arranged individually between the body and axles of a motor vehicle. Generally known, among suspensions of various types, is an air suspension in which the damping force of shock absorber or the spring constant of air spring can be controlled electronically.

Examples of systems which are provided with the air suspensions of this type are described in Published Unexamined Japanese Patent Applications Nos. 3- 208712 and 3-208713. According to the former system, the roll of the vehicle body can be reduced by varying the spring constant of the each air spring. According to the latter system, on the other hand, the roll of the vehicle body can be reduced by varying the damping force of the each air spring or shock absorber.

In reducing the roll of the vehicle body by means of the air suspensions, according to both these systems, air suspensions on the rear-wheel side are first controlled so as to reduce the roll of the rear portion of the vehicle body, and then, after the passage of a predetermined time, air suspensions on the front-wheel side are controlled so as to reduce the roll of the front portion of the vehicle body.

When the roll control for the front portion of the vehicle body is started after the passage of the predetermined time from the start of the roll control for the rear portion of the vehicle body, the roll stiffness of the rear portion first increases immediately after the start of turn of the motor vehicle. Further, the steering characteristic of the vehicle in the initial stage of the turn shifts to the over-steering side, so that the vehicle is allowed to turn with ease.

When the roll control for the front portion of the vehicle body is started after the passage of the predetermined time, the roll stiffness of the front portion also starts to increase, and the steering characteristic of the motor vehicle shifts to the under-steering side, in contrast with the case of the initial stage of the turn. Thus, the motor vehicle steadily turns in the middle and final stages.

The roll control for the vehicle body by means of the suspension system described above is executed on the assumption that the motor vehicle is running on a level road. Accordingly, the delay time or time interval between the start of the roll control for the rear portion of the vehicle body and the start of the roll control for the front portion can be varied only on the basis of the vehicle velocity.

However, the motor vehicle runs not only on a level road but also on an upward or downward slope. When the vehicle goes uphill, the vehicle body load on the air suspensions on the rear-wheel side increases, while that on the air suspensions on the front-wheel side decreases. When the vehicle goes downhill, on the other hand, the vehicle body load on the front-wheel air suspensions increases, while that on the rear-wheel air suspensions decreases.

The increase and decrease of the vehicle body load on the air suspensions on the front- and rear-wheel sides cause the proper steering characteristic of the motor vehicle to change. More specifically, when the vehicle goes uphill, its steering characteristic shifts to the under-steering side. When the vehicle goes downhill, on the other hand, its steering characteristic shifts to the over-steering side.

If the steering characteristic of the motor vehicle is deviated from the proper one due to the gradient of the road, therefore, it cannot be effectively varied even though the roll controls for the front and rear portions of the vehicle body are independently executed with the delay time between them, as mentioned before.

According to the conventional suspension system, moreover, the roll controls for the front and rear portions of the vehicle body are executed without giving consideration to the bent state of the road, that is, the curvature of corners or frequency of cornering, associated with the turn of the motor vehicle, in addition to the gradient of the road. Thus, the steering characteristic of the motor vehicle cannot be optimally varied depending on the behavior of the vehicle.

SUMMARY OF THE INVENTION

The object of the present invention is to provide a suspension system of a motor vehicle, capable of optimally varying the steering characteristic of the vehicle, as well as being capable of reducing the roll of the vehicle body.

The above object is achieved by a suspension system of a motor vehicle according to the present invention. This system comprises suspensions arranged between a vehicle body and individual wheels, for supporting the vehicle body, a front group of front-wheel suspensions providing the front roll stiffness on the front side of the vehicle body, and a rear group of rear-wheel suspensions providing the rear roll stiffness on the rear side of the vehicle body; control means for independently varying the front and rear roll stiffnesses provided by means of the front and rear groups of suspensions, respectively; detecting means for detecting the movement state of the vehicle body and outputting a detection signal; first output means for calculating the roll stiffness of the whole vehicle body in response to the detection signal from the detecting means and delivering a first control signal which determines front and rear roll stiffnesses to be provided, to the control means in accordance with the result of the calculation; arithmetic means for calculating a state variable indicative of the bent state of the road in accordance with the detection signal from the detecting means and outputting the result of the calculation; and second output means for delivering a second control signal to the control means in accordance with the calculation result from the arithmetic means, the second control signal causing the control means to vary the front and rear roll stiffnesses, thereby modifying the steering characteristic of the motor vehicle.

According to the suspension system described above, when the front and rear roll stillnesses are controlled in accordance with the first control signal from the first output means, which is determined depending on the behavior of the motor vehicle, the roll of the vehicle body is reduced as the vehicle turns.

When the bent state of the road is detected by means of the arithmetic means, on the other hand, the second output means supplies the second control signal to the control means and varies the front and rear roll stiffnesses-depending on the bent state by means of the control means, thereby modifying the steering characteristic of the motor vehicle so as to fit the flexure degree of the road.

One first output means includes a first arithmetic unit for calculating an allowable tilt range within which the front portion of the vehicle body tilts sideways, or a supporting or damping force for the front portion of the vehicle body, with respect to the road, in accordance with the detection signal from the detecting means when the motor vehicle turns, and outputting the result of the first calculation, and a second arithmetic unit for calculating an allowable tilt range within which the rear portion of the vehicle body tilts sideways, or a supporting or damping force for the rear portion of the vehicle body, with respect to the road, in accordance with the detection signal from the detecting means when the motor vehicle turns, and outputting the result of the second calculation. One second output means includes an adjusting unit for differentiating the points of time for the delivery of the first and second calculation results from the first and second arithmetic units.

Also according to the first and second output means described above, the rolls of the front and rear portions of the vehicle body can be reduced in accordance with the first calculation result when the motor vehicle turns. By differentiating the points of time for the delivery of the first and second calculation results, moreover, the respective roll stillnesses of the front and rear portions of the vehicle body can be varied, whereby the steering characteristic of the motor vehicle can be modified.

Another first output means includes a first arithmetic unit for calculating an allowable tilt range within which the whole vehicle body tilts sideways, or a supporting or damping force for the whole vehicle body, with respect to the road, in accordance with the detection signal from the detecting means when the motor vehicle turns, and outputting the result of the first calculation, and a second arithmetic unit for calculating the difference between allowable tilt ranges within which the front and rear portions of the vehicle body individually tilt sideways, or the difference between supporting or damping forces for the front and rear portions of the vehicle body, with respect to the road, in accordance with the detection signal from the detecting means when the motor vehicle turns, and outputting the result of the second calculation. Another second output means includes an adjusting unit for validating and invalidating the second and first calculation results from the first and second arithmetic units, respectively, when the first and second computation results are outputted, and invalidating and validating the second and first computation results, respectively, after the passage of a predetermined time.

According to the alternative first and second output means described above, the respective roll stiffnesses of the front and rear portions of the vehicle body are first controlled so as to be different from each other in accordance with the second calculation result when the motor vehicle turns, whereby the steering characteristic of the vehicle is varied. Thereafter, the roll stillnesses of the front and rear portions of the vehicle body are controlled in accordance with the first calculation result, whereby the roll of the whole vehicle body is reduced.

According to the present invention, moreover, there are provided, besides the suspension system described above, two systems for controlling the movement of the vehicle body when the motor vehicle runs on a road. One of these systems comprises detecting means for detecting the movement of the vehicle body and outputting a detection signal; a first arithmetic unit for calculating the steering characteristic of the motor vehicle in the initial stage of a turn in accordance with the detection signal from the detecting means when the motor vehicle turns, and outputting the result of the first calculation; a second arithmetic unit for calculating the steering characteristic of the motor vehicle in the last stage of the turn in accordance with the detection signal from the detecting means when the motor vehicle turns, and outputting the result of the second calculation; and a control unit for controlling the steering characteristics of the motor vehicle in accordance with the first and second outputs from the first and second arithmetic units.

The other system comprises detecting means for detecting the movement of the vehicle body and outputting a detection signal; a first arithmetic unit for calculating the steering characteristic of the motor vehicle in accordance with the detection signal from the detecting means when the motor vehicle turns, and outputting the result of the first calculation; a second arithmetic unit for calculating the steering characteristic of the motor vehicle in the initial stage of the turn in accordance with the detection signal from the detecting means when the motor vehicle turns, and outputting the result of the second calculation; a control unit for controlling a damping force for the vehicle body with respect to the road in accordance with the first and second outputs from the first and second arithmetic units; and an adjusting unit for supplying the second output from the second arithmetic unit to the control unit for a predetermined period of time, and then supplying the first output from the first arithmetic unit to the control unit.

According to the two control systems described above, the steering characteristic of the motor vehicle can be varied between the initial and last stages of the turn as the vehicle turns.

These and other objects of the present application will become more readily apparent from the detailed description given hereinafter. However, it should be understood that the preferred embodiments of the invention are given by way of illustration only, since various changes and modifications within the spirit and scope of the invention will become apparent to those skilled in the art from this detailed description.

BRIEF DESCRIPTION OF THE DRAWINGS

The present invention, together with its objects and advantages, will be more fully understood from the ensuing detailed description and the accompanying drawings, which are given by way of illustration only, and thus, are not limitative of the present invention, and wherein.

DETAILED DESCRIPTION OF THE PREFERRED EMBODIMENTS

Figure 1:
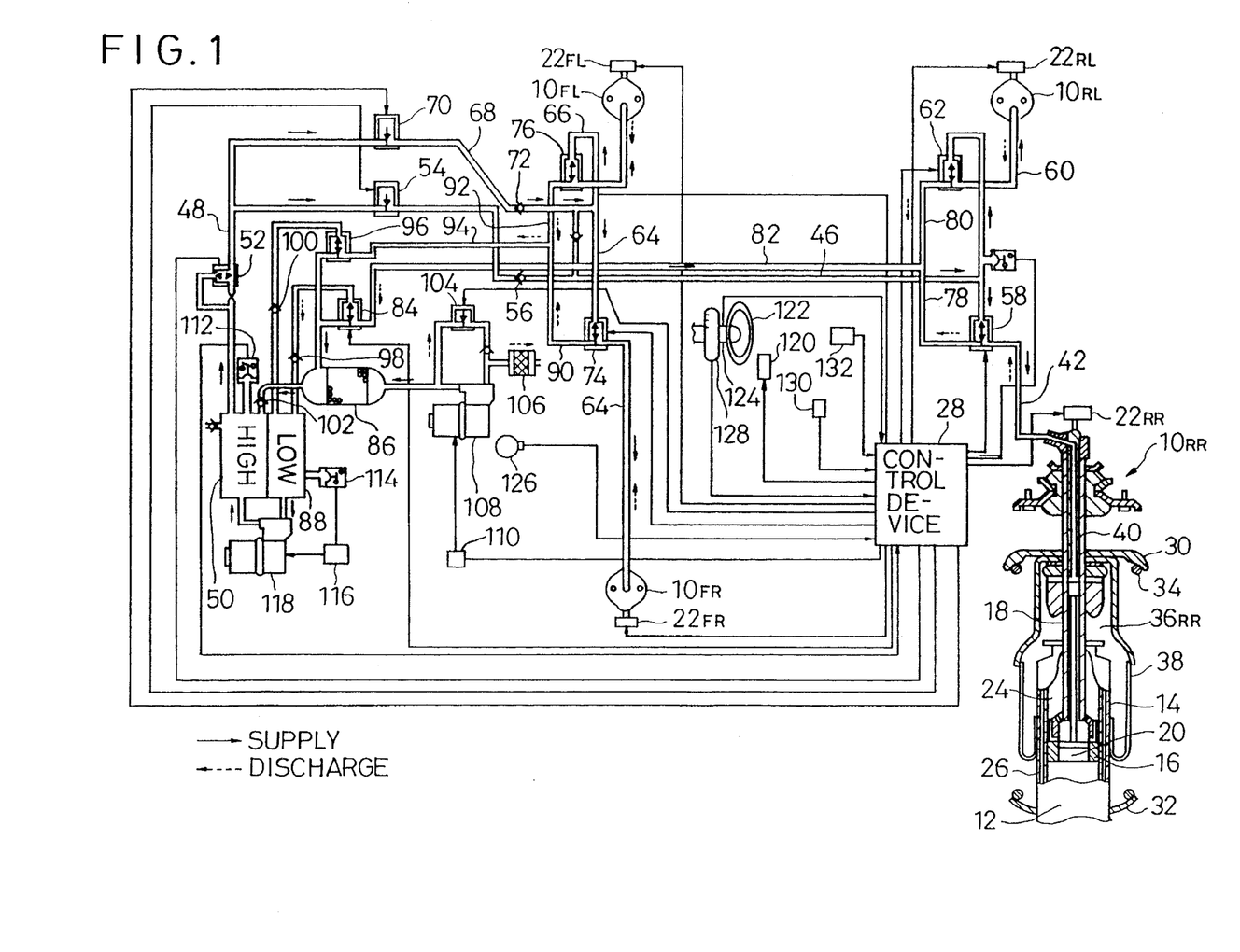
FIG. 1 is a schematic view illustrating an air suspension system of a motor vehicle.

A suspension system shown in FIG. 1 comprises air suspensions for individual wheels of a motor vehicle. The air suspensions on the front-wheel side are denoted by numerals $10_{FL}$ and $10_{FR}$, individually, and the air suspensions on the rear-wheel side by numerals $10_{RL}$ and $10_{RR}$, individually. All the air suspensions have the same construction, so that only the air suspension $10_{RR}$ for the rear right wheel is specifically shown in FIG. 1.

Since the air suspension itself is a conventional device, its construction will now be described in brief.

The air suspension $10_{RR}$ comprises a strut-type shock absorber 12, which includes a selector valve 20 for varying the damping force thereof, as well as a cylinder 14, a piston 16, and a piston rod 18. The selector valve 20 is connected to a damping force switching actuator $22_{RR}$, which can activate the valve 20. When the valve 20 is activated by the actuator $22_{RR}$, it varies the sectional flow area of a valve passage which connects first and second damping chambers 24 and 26, whereby the damping force of the shock absorber 12 is varied in stages. In the present embodiment, the damping force of the shock absorber 12 can be varied in three stages, "soft," "medium," and "hard." The damping force switching actuator $22_{RR}$ is connected electrically to a control device 28, which controls the operation of the actuator $22_{RR}$. Numerals 30 and 32 denote spring bearings between which a coil spring 34 is interposed.

The air suspension $10_{RR}$ further comprises an air spring $36_{RR}$ which is mounted over the shock absorber 12. Part of the spring $36_{RR}$ is defined by a bellows 38. The air spring $36_{RR}$ can be connected to a pneumatic pressure source or the atmosphere by means of an internal passage 40 of the piston rod 18. Accordingly, the air pressure in the air spring $36_{RR}$ can be adjusted by supplying air from the pneumatic pressure source to the inside of the air spring $36_{RR}$, or by discharging the air from the spring $36_{RR}$ into the atmosphere. Thus, the spring constant of the air spring $36_{RR}$ or the rate of spring can be varied depending on the internal air pressure, that is, by supplying to or discharging air from the spring $36_{RR}$.

More specifically, the air spring $36_{RR}$ of the air suspension $10_{RR}$ is connected to a supply line 46 on the rear-wheel side by means of a branch line 42, while the line 46 is connected to a high-pressure reservoir 50, for use as the aforesaid pneumatic pressure source, by means of a main line 48. A flow regulating valve 52 is disposed in the middle of the main line 48, and a solenoid valve 54 and a check valve 56 are successively arranged in the middle of the supply line 46, the former being situated nearer to the main line 48. Further, a supply/discharge valve 58 of a solenoid valve type is disposed in the middle of the branch line 42.

Thus, air in the high-pressure reservoir 50 can be supplied to the air spring $36_{RR}$ through the valves 52, 54, 56 and 58.

On the other hand, an air spring $36_{RL}$ of the air suspension $10_{RL}$ is connected to a junction between the branch line 42 and the supply line 46 by means of a branch line 60, and a supply/discharge valve 62 of a solenoid valve type is disposed in the middle of the branch line 60. Thus, the air in the high-pressure reservoir 50 can be supplied to the air spring $36_{RL}$ through the valves 52, 54, 56 and 62.

Furthermore, branch lines 64 and 66 extend from air springs $36_{FR}$ and $36_{FL}$ of the air suspensions $10_{FR}$ and $10_{FL}$, respectively, and are connected to the main line 48 by means of a common line 68. A solenoid valve 70 and a check valve 72 are successively arranged in the middle of the supply line 68, the former being situated nearer to the main line 48. Also, supply/discharge valves 74 and 76 are arranged in the middle of the branch lines 64 and 66, respectively. Thus, the air in the high-pressure reservoir 50 can be supplied to the air spring $36_{FR}$ through the valves 52, 70, 72 and 74, and to the air spring $36_{FL}$ through the valves 52, 70, 72 and 76.

The supply/discharge valves 58 and 62 of the air suspensions $10_{RR}$ and $10_{RL}$ are connected to an exhaust line 82 by means of branch lines 78 and 80, respectively. The exhaust line 82 can be connected to a drier 86 or a low-pressure reservoir 88 through an exhaust valve 84. Also, the supply/discharge valves 74 and 76 of the air suspensions $10_{FR}$ and $10_{FL}$ are connected to an exhaust line 94 by means of branch lines 90 and 92, respectively. The exhaust line 94 can be connected to the drier 86 or the low-pressure reservoir 88 through an exhaust valve 96.

Thus, the respective air springs 36 of the air suspensions 10 can be also connected individually to the exhaust lines through their corresponding supply/discharge valves.

Check valves 98 and 100 are interposed between the low-pressure reservoir 88 and the exhaust valve 84 and between the reservoir 88 and the exhaust valve 96, respectively.

The drier 86 is connected to the high-pressure reservoir 50 through a check valve 102, on the one side, and to an air cleaner 106 through an exhaust valve 104 and a check valve, on the other side.

A line which connects the drier 86 and the air cleaner 106 is provided with a by-pass line for by-passing the exhaust valve 104 and the check valve, and a compressor 108 is disposed in the middle of the by-pass line. The compressor 108 is connected electrically to the control device 28 through a relay 110.

The high-pressure reservoir 50 is provided with a pressure switch 112, which supplies an on-signal to the control device 28 when the pressure in the reservoir 50 is reduced below a predetermined value. Upon receiving the on-signal from the switch 112, the control device 28 causes the relay 110 to drive the compressor 108, whereupon the compressor 108 supplies compressed air to the high-pressure reservoir 50 through the drier 86. Thus, the pressure in the reservoir 50 is maintained at or above the predetermined value.

Also, the low-pressure reservoir 88 is provided with a pressure switch 114, which supplies an on-signal to a relay 116 when the pressure in the reservoir 88 is increased above a predetermined pressure. Upon receiving the on-signal from the switch 114, the relay 116 drives a compressor 118 which is located between the reservoirs 50 and 88. Thereupon, the compressor 118 supplies air from the low-pressure reservoir 88 to the high-pressure reservoir 50.

In FIG. 1, paths of air supply from the high-pressure reservoir 50 to the individual air suspensions are indicated by full-line arrows, and paths of air discharge from the air suspensions are indicated by broken-line arrows.

Besides the pressure switches 112 and 114 and the relay 110, various sensors are connected to the control device 28. These sensors include an indicator 120 for indicating hydraulic pressure, a sensor 124 for detecting the steering angle of a steering wheel 122, and a sensor 126 for detecting the opening of a throttle valve of an engine. The sensors further include a sensor 128 of a speedometer for detecting the vehicle velocity, a transverse G sensor 130 of, e.g., a differential transformer type for detecting the transverse acceleration which acts on the vehicle body, a sensor 132 for detecting the engine speed, etc.

Based on signals from these various sensors, the control device 28 varies the damping force and/or spring constant of each air suspension 10, thereby controlling the roll of the vehicle body. When the motor vehicle is running on a level straight road, however, the damping force of each air suspension is adjusted to "soft," and the spring constant of each air suspension, that is, the pressure inside each air spring 36, is kept at a predetermined value.

Figure 2:
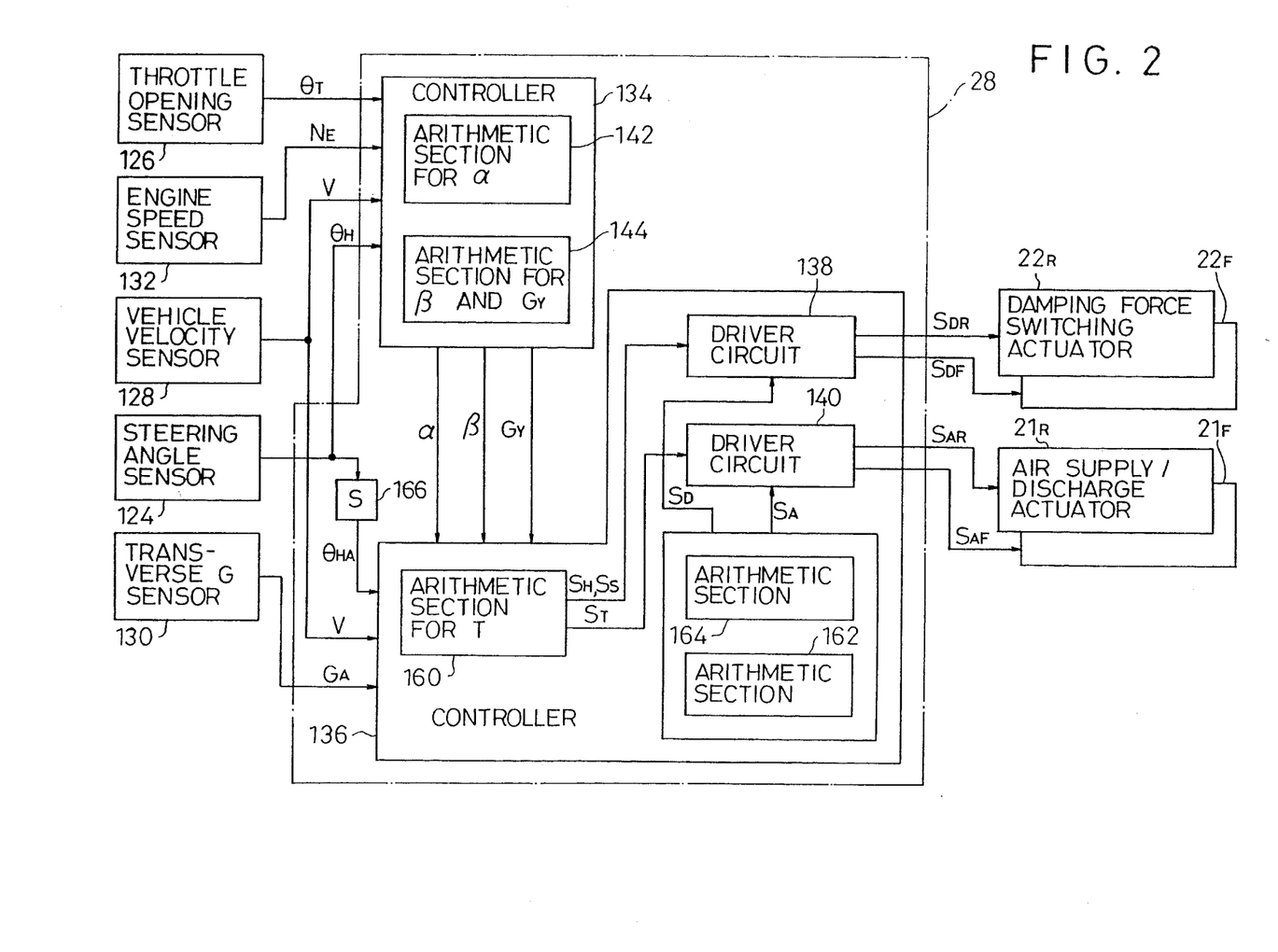
FIG. 2 is a block diagram illustrating a control unit shown in FIG. 1.

More specifically, as shown in the block diagram of FIG. 2, the control device 28 generally comprises controllers 134 and 136. The controller 134 calculates the state of the road on which the motor vehicle runs, and outputs the calculation result. The controller 136 is used to control the air suspensions 10. These controllers 134 and 136 each include a microcomputer, a memory, and an input interface for receiving the sensor signals from the various sensors.

The controllers 134 and 136 are connected to each other by means of a communication line. Accordingly, the controller 134 includes an interface for transmitting the aforesaid calculation result to the controller 136, while the controller 136 includes an interface for receiving the calculation result.

Further, the controller 136 includes a driver circuit 138 for operating the respective damping force switching actuators 22 of the air suspensions 10, and a driver circuit 140 for operating, air supply/discharge actuators 21 which can vary the respective spring constants of the air suspensions 10.

More specifically, an air supply/discharge actuator $21_{RR}$ of the air suspension $10_{RR}$ includes the supply/discharge valve 58, and air supply/discharge actuators $21_{RL}$, $21_{FR}$ and $21_{FL}$ of the other air suspensions $10_{RL}$, $10_{FR}$ and $10_{FL}$ includes the supply/discharge valves 62, 74 and 76, respectively.

The controller 134 includes an arithmetic section 142 for calculating the gradient of the road and an arithmetic section 144 for calculating the bent state or flexure degree of the road. The arithmetic section 142 is shown in detail in FIG. 3.

Figure 3:
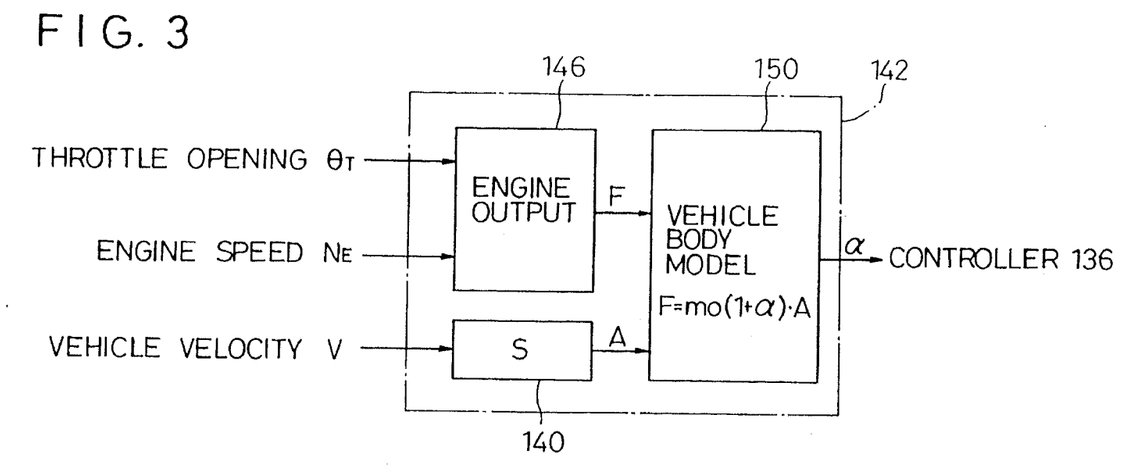
FIG. 3 is a block diagram illustrating an arithmetic section for the gradient shown in FIG. 2.

The arithmetic section 142 includes an arithmetic logic 146 for calculating the engine output. The arithmetic logic 146 receives a throttle opening $\theta_T$ from the sensor 126 and the engine speed $N_E$ from the sensor 132, and calculates an engine output F on the basis of these values $\theta_T$ and $N_E$. More specifically, the arithmetic logic 146 has a map (not shown) which indicates the engine output with use of the throttle opening $\theta_T$ and the engine speed $N_E$ as parameters. Thus, the engine output F is read out from the map in the arithmetic logic 146 in accordance with the throttle opening $\theta_T$ and the engine speed $N_E$. Thereafter, the arithmetic logic 146 corrects the engine output, obtained from the map, in accordance with the characteristics of the engine transmission and the tires of the motor vehicle, and delivers the corrected value as the engine output F. Thus, the engine output F indicates a final driving force transmitted to the driving wheels of the motor vehicle.

The arithmetic section 142 further includes a differentiator 148 for differentiating the vehicle velocity V from the sensor 128. The differentiator 148 outputs a value dV/dt obtained by differentiating the vehicle velocity V by time, that is, longitudinal acceleration A on the vehicle body.

The engine output F and the longitudinal acceleration A on the vehicle body are supplied to a gradient calculation logic 150 of the arithmetic section 142. In the logic 150, the gradient α of the road is calculated and outputted in accordance with the engine output F and the longitudinal acceleration A.

More specifically, a static mass $m_o$ of the vehicle is previously stored in the gradient calculation logic 150. If the running resistance of the vehicle attributable to the gradient α is $F_1$, therefore, an actual accelerating force $F_o$ on the vehicle is expressed as follows:

$$F_o = F - F_1 = m_o A.$$

The running resistance $F_1$ is given by a value obtained by multiplying the product of the static mass of the vehicle and the gradient α by the longitudinal acceleration A. If $F_1 = (m_o \cdot \alpha)$. A is given, therefore, the engine output F is expressed as follows:

$$F (= m \cdot a) = m_o \cdot a + (m_o \cdot \alpha) \cdot a$$
$$= m_o \cdot (1 + \alpha) \cdot a.$$

In the above equation, m $(= m_o \cdot (1+\alpha))$ represents the mass (dynamic mass) of the vehicle at the time concerned.

If the engine output F and the longitudinal acceleration A are supplied to the gradient calculation logic 150, therefore, the logic 150 can calculate the gradient α of the road according to the above equation. To be concrete, the gradient α, calculated according to the above equation, is expressed in terms of an angle.

Figure 4:
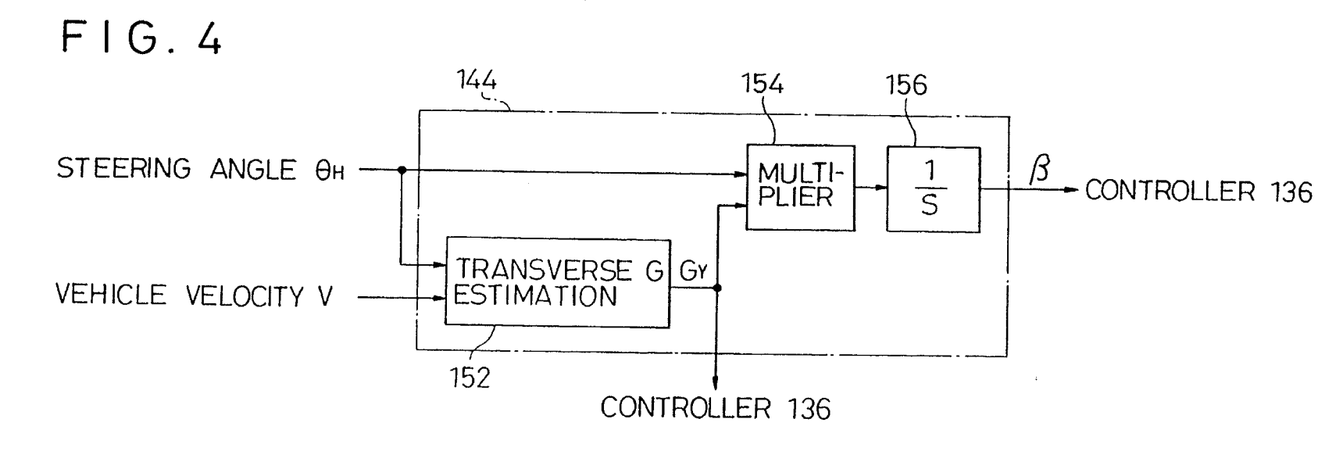
FIG. 4 is a block diagram illustrating an arithmetic section for the flexure degree shown in FIG. 2.

On the other hand, the arithmetic section 144 is shown in detail in the block diagram of FIG. 4. This arithmetic section 144 includes a transverse G estimation logic 152, which estimates a transverse acceleration $G_Y$ acting on the vehicle body.

More specifically, the vehicle velocity V from the sensor 128 and the steering angle $\theta_H$ from the sensor 124 are supplied to the transverse G estimation logic 152, whereupon the logic 152 calculates the transverse acceleration $G_Y$ from the vehicle velocity V and the steering angle $\theta_H$ according to the following equation.

$$G_Y = \{V/L \cdot (1 + K \cdot V^2)\} \cdot \theta_H,$$

where L and K are constants.

The calculated transverse acceleration $G_Y$ and steering angle $\theta_H$ are supplied to a multiplier 154, whereupon the multiplier 154 multiplies the acceleration $G_Y$ by the angle $\theta_H$, and supplies the multiplication result to an integrator 156.

The integrator 156 integrates the multiplication result from the multiplier 154 for a predetermined time (e.g., 20 sec.), and outputs the resulting integral value as a flexure degree β of the road.

More specifically, the flexure degree β of the road is calculated as follows:

$$\beta = (1/n) \cdot \{\Sigma (G_Y(i)^2 \cdot \theta_H(i)^2)\}^{1/2},$$

where n is the number of data on the transverse acceleration $G_Y$ and the steering angle $\theta_H$, and i is the data number which can take integer values from 1 to n. If the data sampling period is 1 sec., for example, then n is 20.

The gradient α and the flexure degree β, calculated in the aforesaid manner by means of the arithmetic sections 142 and 144, are supplied to the controller 136 through communication. Also, the transverse acceleration $G_Y$, calculated by means of the transverse G estimation logic 152 of the arithmetic section 144 is supplied to the controller 136 through communication.

As shown in FIG. 2, the controller 136 includes an arithmetic section 158 for calculating controlled variables for regulating the roll of the vehicle body and an arithmetic section 160 for calculating the output timing for each controlled variable.

Further, the arithmetic section 158 is divided into two sections, an arithmetic section 162 for a first controlled variable for controlling the damping force of each air suspension and an arithmetic section 164 for a second controlled variable for controlling the spring constant of each air suspension, that is, air supply/discharge time.

The arithmetic sections 162 and 164 are supplied with the vehicle velocity V, as well as a value obtained by differentiating the steering angle $\theta_H$ by means of a differentiator 166, that is, a steering angular velocity $\theta_{HA}$. Based on the velocities $\theta_{HA}$ and V, the arithmetic sections 162 and 164 calculate the first and second controlled variables, respectively.

Figure 5:
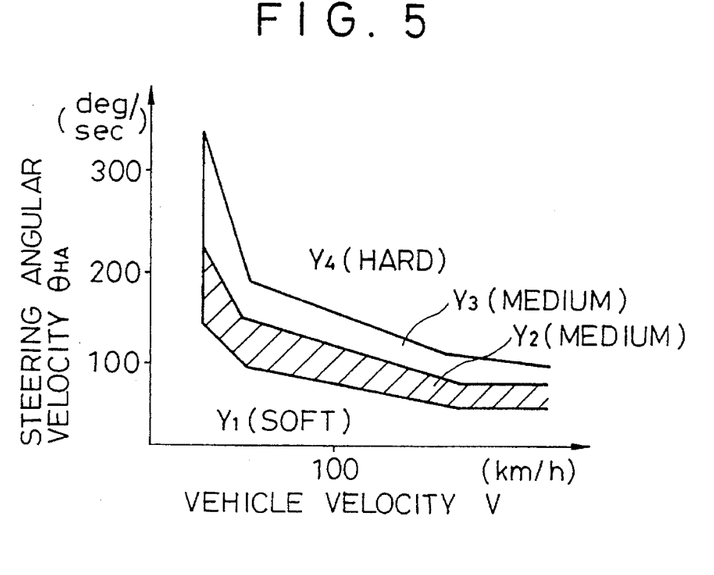
FIG. 5 is a graph for determining the damping force of an air suspension on the basis of the vehicle velocity and steering angular velocity.

More specifically, the first controlled variable can be obtained from the map of FIG. 5. This map has four regions $Y_1$, $Y_2$, $Y_3$ and $Y_4$ which are divided by the vehicle velocity V and the steering angular velocity $\theta_{HA}$, and the damping force of each air suspension 10 is determined for each of these regions. Thus, the damping force of the air suspension 10 is adjusted to "soft" when the region $Y_1$ contains a control point which is determined by the vehicle velocity V and the steering angular velocity $\theta_{HA}$, and to "medium" when the region $Y_2$ or $Y_3$ contains the control point. When the region $Y_4$ contains the control point, moreover, the damping force of the air suspension 10 is adjusted to "hard."

Accordingly, the first controlled variable or first control signal $S_D$, delivered from the arithmetic section 162 to the driver circuit 138, has a value which corresponds to the required damping force of the air suspension 10. On receiving the first control signal $S_D$, therefore, the driver circuit 138 supplies the damping force switching actuators $22_R$ and $22_F$ of each air suspension 10, respectively, with switching signals $S_{DR}$ and $S_{DF}$ corresponding to the first control signal $S_D$. Based on these switching signals, the actuators $22_R$ and $22_F$ adjust the respective damping forces of their corresponding air suspensions 10 to "soft," "medium," or "hard."

As seen from FIG. 5, the respective damping forces determined by means of the damping force switching actuators $22_R$ and $22_F$ increase as the steering angular velocity $\theta_{HA}$ or the turning speed of the motor vehicle increases. Thus, the roll or lateral tilt of the vehicle body can be reduced effectively.

Figure 6:
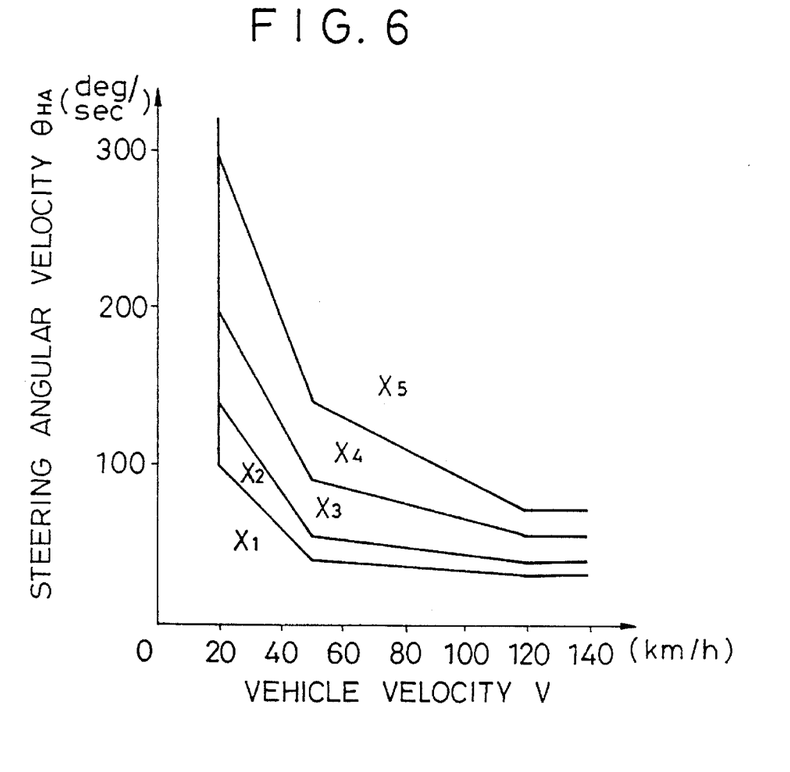
FIG. 6 is a graph for determining the spring constant of the air suspension on the basis of the vehicle velocity and steering angular velocity.

On the other hand, the second controlled variable can be obtained from the map of FIG. 6. This map, like the map of FIG. 5, has five regions $X_1$, $X_2$, $X_3$, $X_4$ and $X_5$ which are divided by the vehicle velocity V and the steering angular velocity $\theta_{HA}$, and the air supply/discharge time for each air suspension 10 or its air spring 36 is determined for each of these regions. As the control point which is determined by the vehicle velocity V and the steering angular velocity $\theta_{HA}$ moves from the region $X_1$ toward the region $X_5$, in this case, the air supply/discharge time increases.

Accordingly, the second controlled variable or second-control signal $S_A$, delivered from the arithmetic section 164 to the driver circuit 140, has a value which corresponds to the air supply/discharge time. Upon receiving the second control signal $S_A$, therefore, the driver circuit 140 supplies the air supply/discharge actuators $21_R$ and $21_F$ of each air suspension 10, respectively, with supply/discharge signals $S_{AR}$ and $S_{AF}$ corresponding to the second control signal $S_A$. Based on these supply/discharge signals, the respective operations of the air supply/discharge actuators $21_R$ and $21_F$ are controlled.

The supply/discharge signals $S_{AR}$ and $S_{AF}$ are indicative of air supply or discharge time for the air spring 36 of each air suspension 10. More specifically, the supply/discharge signals, which are supplied to the respective supply/discharge actuators 21 of those air suspensions 10 situated on the outside with respect to the turn of the motor vehicle, determine the air supply time, thereby increasing the respective spring constants of those springs 36. For the respective supply/discharge actuators 21 of those air suspensions 10 which are situated on the inside, on the other hand, the supply/discharge signals determine the air discharge time, thereby reducing the respective spring constants of those springs 36.

As seen from FIG. 6, the supply/discharge times for the air supply/discharge actuators $21_R$ and $21_F$ also increase as the steering angular velocity $\theta_{HA}$ or the turning speed of the motor vehicle increases. Thus, the roll or lateral tilt of the vehicle body can be reduced effectively.

The following is a description of the arithmetic section 160. In this arithmetic section 160, a delay time between the start of control of the air suspensions $10_R$ on the rear-wheel side and the start of control of the air suspensions $10_{RR}$ on the front-wheel side is calculated in order to vary the steering characteristic of the motor vehicle.

More specifically, the arithmetic section 160 calculates a delay time T corresponding to the time interval which elapses from the instant that the supply/discharge signal $S_{AR}$ is delivered from the driver circuit 140 to the air suspensions $10_R$ on the rear-wheel side, that is, their respective air supply/discharge actuators $21_R$, until the supply/discharge signal $S_{AR}$ is delivered from the circuit 140 to the air suspensions $10_F$ on the front-wheel side, that is, their respective air supply/discharge actuators $21_F$. Then, the arithmetic section 160 supplies the driver circuit 140 with a delay signal corresponding to the delay time T.

Figure 7:
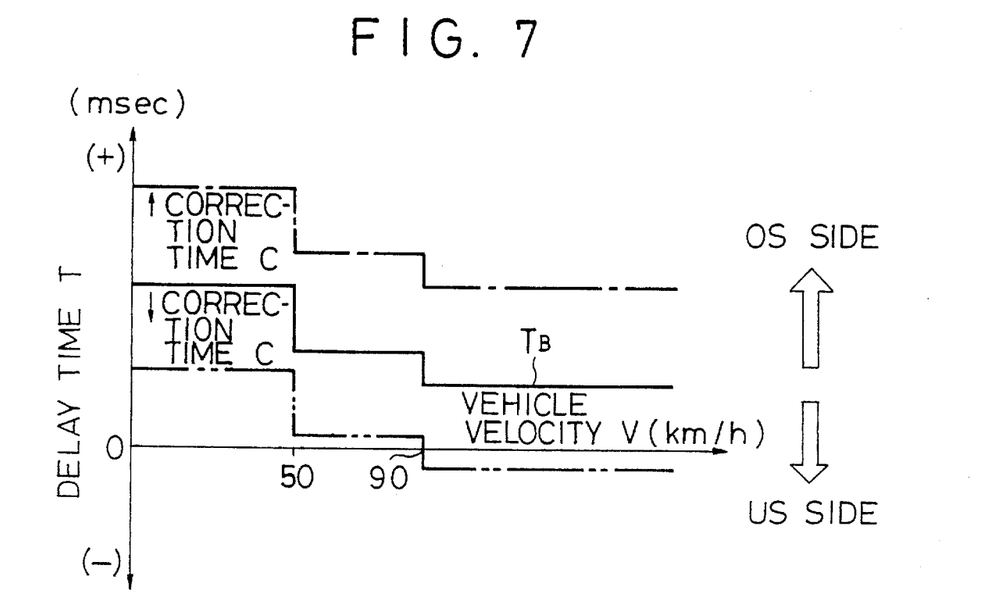
FIG. 7 is a graph showing the relationship between the vehicle velocity and delay time.

The arithmetic section 160 has a map for obtaining the delay time T, as shown in FIG. 7. This map contains a reference delay time $T_B$ which is determined depending on the vehicle velocity V, as indicated by full line. The reference delay time $T_B$ is reduced by stages as the vehicle velocity V increases.

Moreover, the arithmetic section 160 calculates a correction time C (FIG. 7) for the reference delay time $T_B$ on condition that the control point which is determined by the vehicle velocity V and the steering angular velocity $\theta_{HA}$ is contained in any other region than $X_1$, for example. The correction time C is determined depending on the gradient α and the flexure degree β of the road. Accordingly, the arithmetic section 160 outputs the sum of the reference delay time $T_B$ and the correction time C as a final value of the delay time T. Thus, a characteristic line for determining the delay time T is obtained by moving up or down a characteristic line for the reference delay time $T_B$ in accordance with the correction time C, as in the map of FIG. 7.

Figure 8:
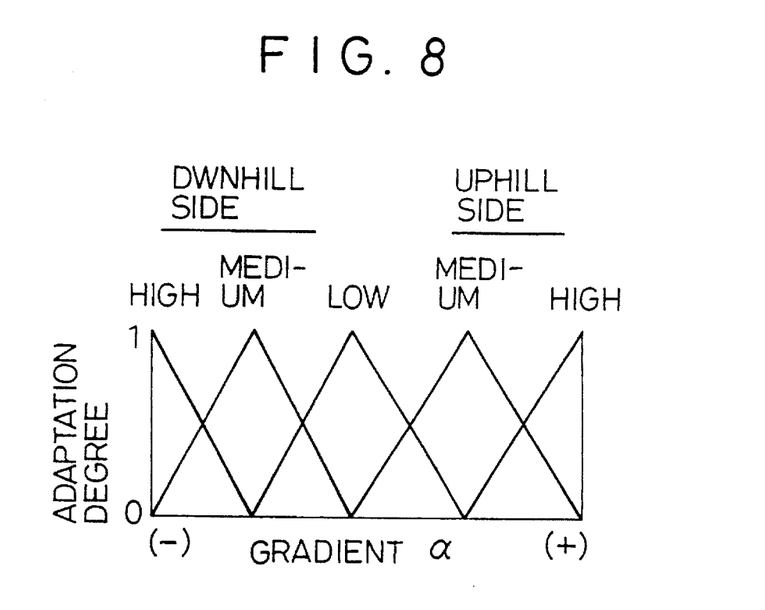
FIG. 8 is a graph showing a membership function based on the gradient of the road as an input.
Figure 9:
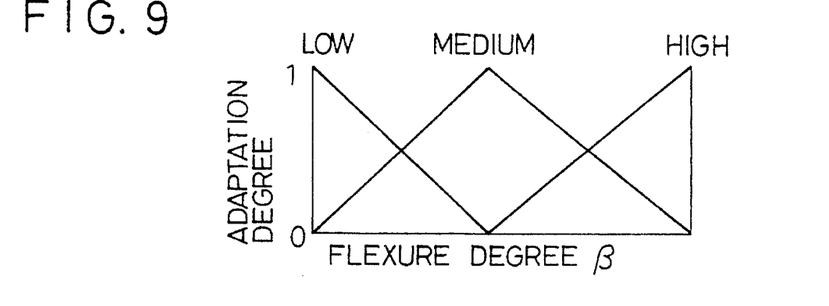
FIG. 9 is a graph showing a membership function based on the flexure degree of the road as an input.
Figure 10:
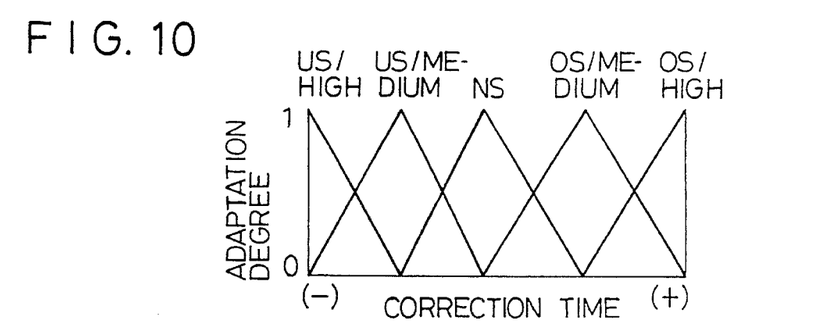
FIG. 10 is a graph showing a membership function for determining the correction time.

The correction time C is determined using fuzzy inference based on the gradient α and the flexure degree β as input variables. FIG. 8 shows a membership function based on the gradient α as an input, and FIG. 9 shows a membership function based on the flexure degree $\beta$ as an input. FIG. 10 shows a membership function for obtaining the correction time C on the basis of the adaptation degrees shown in FIGS. 8 and 9.

More specifically, rules of the fuzzy inference represented by the graphs of FIGS. 8 to 10 are given as follows:

Rule 1
If the gradient $\alpha$ and the flexure degree $\beta$ are high on the downhill side and low, respectively, then the steering characteristic is modified so as to be high on the under-steering (US) side.

Rule 2
If the gradient $\alpha$ and the flexure degree $\beta$ are high on the downhill side and medium, respectively, then the steering characteristic is modified so as to be medium on the US side.

Rule 3
If the gradient $\alpha$ and the flexure degree $\beta$ are high on the downhill side and high, respectively, then the steering characteristic is modified so as to be normal-steering (NS).

Rule 4
If the gradient $\alpha$ and the flexure degree $\beta$ are medium on the downhill side and low, respectively, then the steering characteristic is modified so as to be medium on the US side.

Rule 5
If the gradient $\alpha$ and the flexure degree $\beta$ are medium on the downhill side and medium, respectively, then the steering characteristic is modified so as to be NS.

Rule 6
If the gradient $\alpha$ and the flexure degree $\beta$ are medium on the downhill side and high, respectively, then the steering characteristic is modified so as to be medium on the over-steering (OS) side.

Rule 7
If both the gradient $\alpha$ and the flexure degree $\beta$ are low, then the steering characteristic is modified so as to be NS.

Rule 8
If the gradient $\alpha$ and the flexure degree $\beta$ are low and medium, respectively, then the steering characteristic is modified so as to be medium on the OS side.

Rule 9
If the gradient $\alpha$ and the flexure degree $\beta$ are low and high, respectively, then the steering characteristic is modified so as to be high on the OS side.

Rule 10
If the gradient $\alpha$ and the flexure degree $\beta$ are medium on the uphill side and low, respectively, then the steering characteristic is modified so as to be medium on the OS side.

Rule 11
If the gradient $\alpha$ and the flexure degree $\beta$ are medium on the uphill side and medium, respectively, then the steering characteristic is modified so as to be high on the OS side.

Rule 12
If the gradient $\alpha$ and the flexure degree $\beta$ are medium on the uphill side and high, respectively, then the steering characteristic is modified so as to be high on the OS side.

Rule 13
If the gradient $\alpha$ and the flexure degree $\beta$ are high on the uphill side and low, respectively, then the steering characteristic is modified so as to be high on the OS side.

Rule 14
If the gradient $\alpha$ and the flexure degree $\beta$ are high on the uphill side and medium, respectively, then the steering characteristic is modified so as to be high on the OS side.

Rule 15
If the gradient $\alpha$ and the flexure degree $\beta$ are high on the uphill side and high, respectively, then the steering characteristic is modified so as to be high on the OS side.

Thus, when adaptation degrees for the gradient and the flexure degree $\beta$ are obtained for each of the aforesaid rules from the membership functions of FIGS. 8 and 9 by the max-min method, a final controlled variable or correction time C is calculated according to the membership function of FIG. 10.

Figure 11:
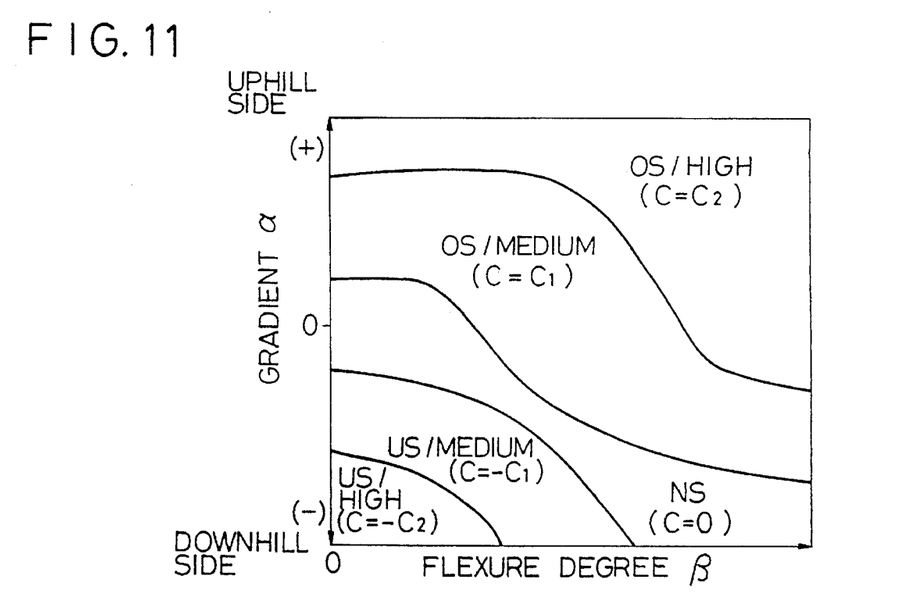
FIG. 11 is a graph showing correction times for determining the steering characteristic of the motor vehicle on the basis of the gradient and flexure degree.

The correction time C may be obtained according to the map of FIG. 11. More specifically, FIG. 11 shows regions for the steering characteristic which embodies the aforementioned fuzzy rules, and a correction time to be set is given for each region. If the map of FIG. 11 is prepared in advance, therefore, the correction time C can be read from the map of FIG. 11 immediately when the gradient $\alpha$ and the flexure degree $\beta$ are calculated. In FIG. 11, symbols $C_1$ and $C_2$ indicate values of the correction time C for their corresponding regions, and $C_2 > C_1$ is given.

When the correction time C is calculated so that the delay time T is finally determined in this manner, the delay signal $S_T$ corresponding to the delay time T is supplied from the arithmetic section 160 to the driver circuit 140. On receiving the delay signal $S_T$, the driver circuit 140 delivers the supply/discharge signal $S_{AR}$ to the air supply/discharge actuators $21_R$, and then, after the passage of the delay time T, delivers the supply/discharge signal $S_{AF}$ to the supply/discharge actuators $21_F$.

In the present embodiment, moreover, the arithmetic section 160 can supply the driver circuit 138 with a holding signal $S_H$ and a flag signal $S_S$ which is indicative of a switching state of the steering characteristic. These signals $S_H$ and $S_S$ are delivered from the arithmetic section 160 to the driver circuit 138 only when the control point, which is determined by the vehicle velocity V and the steering angular velocity $\theta_{HA}$, is contained in the hatched region $Y_2$ shown in the map of FIG. 5. In the present embodiment, the holding signal $S_H$ has a value equal to that of the delay signal $S_T$ calculated at the point of time concerned, while the flag signal $S_S$ has a value which indicates whether the value of the correction time C calculated at the same point of time is positive or not.

Upon receiving the holding signal $S_S$ and the flag signal $S_S$, the driver circuit 138 delivers the switching signals $S_{DF}$ and $S_{DR}$ to the air suspensions $10_F$ and $10_R$ on the front- and rear-wheel sides or their respective damping force switching actuators $22_F$ and $22_R$, respectively, on condition that the steering characteristic of the motor vehicle is controlled on the OS side, as seen from the map of FIG. 11. In this case, the signal $S_{DF}$ serves to switch the damping force of the actuators $22_F$ to "soft," and the signal $S_{DR}$ to switch the damping force of the actuators $22_R$ to "hard." The output time for these signals $S_{DF}$ and $S_{DR}$ is equal to a holding time which is determined by the holding signal $S_H$, that is, the delay time T.

If the correction time C, which is indicated by the flag signal $S_S$, has a negative value such that the steering characteristic of the motor vehicle is controlled on the US side, as seen from the map of FIG. 11, on the other hand, the driver circuit 138 delivers the switching signals $S_{DF}$ and $S_{DR}$ to the damping force switching actuators $22_F$ and $22_R$ on the front- and rear-wheel sides, respectively. In this case, the signal $S_{DF}$ serves to switch the damping force of the actuators $22_F$ to "hard," and the signal $S_{DR}$ to switch the damping force of the actuators $22_R$ to "soft." The output time for these signals $S_{DF}$ and $S_{DR}$ is also equal to the holding time which is determined by the holding signal $S_H$, that is, the delay time T.

In both of these cases, the respective damping forces of the damping force switching actuators $22_F$ and $22_R$ are restored to "medium" when the holding time terminates after the delivery of the switching signals $S_{DF}$ and $S_{DR}$.

When the control point is contained in region $Y_2$ shown in FIG. 5, therefore, the damping forces of the damping force switching actuators $22_R$ and $22_F$ should normally be adjusted to "medium," as mentioned before. In this case, however, the damping forces of the actuators $22_R$ and $22_F$ are different from each other. That is, there is a given difference between these damping forces, as shown in the table below.

TABLE

| | DAMPING FORCE | RESTORED STATE |
|---|---|---|
| OS SIDE/FRONT | SOFT | MEDIUM |
| OS SIDE/REAR | HARD | MEDIUM |
| US SIDE/FRONT | HARD | MEDIUM |
| US SIDE/REAR | SOFT | MEDIUM |

When the motor vehicle turns it goes uphill, the correction time C takes a large positive value, as seen from the map of FIG. 11, so that the characteristic which determines the delay time T undergoes a substantial shift from the full-line characteristic line toward the dashed-line characteristic line, as in FIG. 7. In this case, the delay time T obtained from FIG. 7 increases more sharply than the reference delay time $T_B$, which is determined on the basis of the vehicle velocity V only when the motor vehicle runs on a level road.

Figure 12:
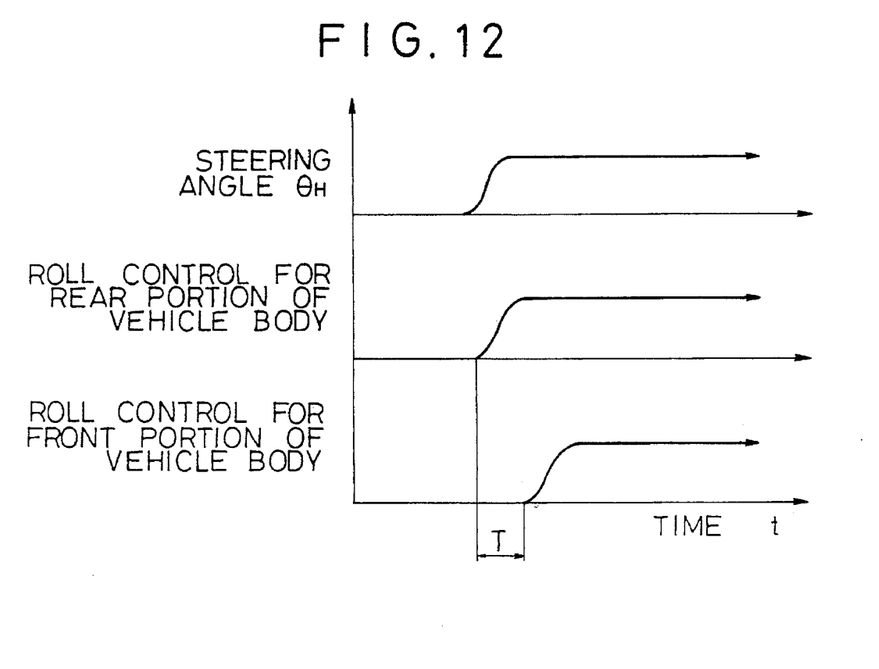
FIG. 12 is a time chart showing the way the roll control for the front portion of the vehicle body is started with a delay time after the start of the roll control for the rear portion of the vehicle body.

Thus, when the timings for the delivery of the supply/discharge signals $S_{AR}$ and $S_{AL}$ to the air supply/discharge actuators $21_R$ and $21_F$ are controlled in accordance with the delay time T, as mentioned before, operation control for the air supply/discharge actuators $21_R$ on the rear-wheel side is first started. Next, after the passage of the delay time T, operation control for the air supply/discharge actuators $21_F$ on the front-wheel side is started. As shown in FIG. 12, therefore, the roll stiffness of the rear portion of the vehicle body increases earlier than that of the front portion of the vehicle body, so that the cornering force of the rear wheels is reduced in the initial stage of the turn of the motor vehicle, and the steering characteristic of the vehicle undergoes a substantial shift to the OS side. When the motor vehicle goes uphill, the steering characteristic of the vehicle normally shifts to the US side. However, this shift is canceled as the steering characteristic is positively shifted to the OS side, as mentioned before. Thus, even while the motor vehicle is going uphill, it can enjoy the same proper steering characteristic as the one obtained when it runs on a level road.

If the flexure degree β of the road is high in the case where the road is a gentle upward slope, that is, where the gradient α is low, the correction time C takes a large positive value, as seen from the map of FIG. 11, so that the delay time T increases considerably. In this case, the gradient α of the road does not cause a great change of the steering characteristic of the motor vehicle, so that the steering characteristic consequently undergoes a shift to the OS side. As a result, the vehicle can turn easily in the initial stage of its turn, thus enjoying a sporty run.

If the steepness of the upward slope is medium, the correction time C takes a small positive value, so that the delay time T slightly increases from the value of the reference delay time $T_B$. Thus, the delay time T is adjusted in accordance with the gradient a of the road. Also in this ease, the proper steering characteristic of the motor vehicle can be maintained.

When the motor vehicle runs on a steep downward slope, on the other hand, the correction time C takes a large negative value, so that the delay time T is substantially reduced from the value of the reference delay time $T_B$ which is determined depending on the vehicle velocity V only. In this case, the time for the start of roll control for the front portion of the vehicle body is subject to only a small delay behind that for the rear portion of the vehicle body. In the initial stage of the turn of the motor vehicle, therefore, the cornering force of the rear wheels is much greater than that for the aforesaid case of the downward slope, and the steering characteristic of the vehicle shifts to the US side. When the motor vehicle goes downhill, the steering characteristic of the vehicle normally shifts to the OS side. However, this shift is canceled as the steering characteristic of the vehicle is positively shifted to the US side, as mentioned before. Thus, even while the motor vehicle is going downhill, it can enjoy the same proper steering characteristic as the one obtained when it runs on a level road.

If the steepness of the downward slope is medium, the correction time C takes a small negative value, so that the delay time T is only slightly reduced from the value of the reference delay time $T_B$. Thus, also in this case, the delay time T is adjusted in accordance with the gradient α of the road. In this manner, the proper steering characteristic of the motor vehicle can be maintained.

If the flexure degree β of the road increases to a moderate degree in the case where the road is a steep downward slope, on the other hand, the correction time C takes a small negative value, so that the delay time T is only slightly reduced from the value of the reference delay time $T_B$. In this case, the steering characteristic of the motor vehicle is inclined to the OS side as compared with the original characteristic for the aforementioned reason, so that the vehicle can turn easily.

If the flexure degree β is high when the motor vehicle is running on the steep downward slope, moreover, the correction time C is zero, so that the delay time T is equal to the reference delay time $T_B$. In this case, the steering characteristic of the vehicle undergoes a greater shift to the OS side than in .the case where the flexure degree β is medium, so that the motor vehicle can turn more easily, thus enjoying a sporty run.

Even when the motor vehicle is running on a level road, the correction time C varies depending on the value of the flexure degree β. As the flexure degree β increases from the medium degree, the correction time C increases by stages, as seen from the map of FIG. 11, so that the delay time T also increases. As a result, the steering characteristic of the motor vehicle shifts further to the OS side as the flexure degree β increases, thus ensuring a sporty run of the vehicle.

Figure 13:
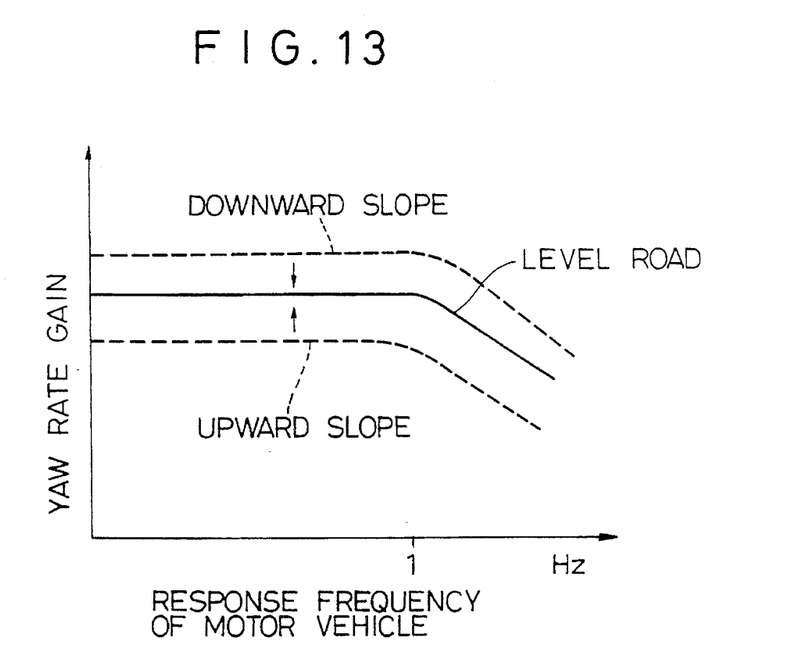
FIG. 13 is a graph showing the relationship between the response frequency and yaw rate gain of the motor vehicle.

Referring to FIG. 13, there is shown the relationship between the response frequency and yaw rate gain of the motor vehicle. When the aforementioned control of the steering characteristic of the vehicle is executed, the yaw rate gain characteristic resembles the characteristic for the case of the level road without regard to the sloping direction, upward or downward, of the road.

In the above description, the respective roll stiffnesses of the front and rear portions of the motor vehicle body are varied depending on the respective spring constants of the air suspensions $10_R$ and $10_F$ on the front- and rear-wheel sides, that is, the control timings for the air supply/discharge actuators $21_R$ and $21_F$. In the present embodiment, however, these roll stiffnesses are varied by means of the damping force switching actuators $22_R$ and $22_F$ as well as the actuators $21_R$ and $21_F$.

Thus, when the region $Y_2$ contains the control point which is determined by the vehicle velocity V and the steering angular velocity $\theta_{HA}$, as shown in FIG. 5, the respective damping forces of the damping force switching actuators $22_R$ and $22_F$ are also switched, as mentioned before. More specifically, when the steering characteristic of the motor vehicle is shifted to the OS side by means of the air supply/discharge actuators $21_R$ and $21_F$, as shown in the aforementioned table, the damping force of the actuators $22_F$ is switched to "soft," while that of the actuators $22_R$ is switched to "hard."

When the steering characteristic of the motor vehicle is shifted to the US side by means of the air supply/discharge actuators $21_R$ and $21_F$, on the other hand, the damping force of the actuators $22_F$ is switched to "hard," while that of the actuators $22_R$ is switched to "soft."

When the respective damping forces of the damping force switching actuators $22_R$ and $22_F$ are switched in this manner, this switching control facilitates the control of the roll stiffness of the vehicle body by means of the air supply/discharge actuators $21_R$ and $21_F$.

The present invention is not limited to the embodiment described above. For example, the suspension system may be provided with detecting means for determining whether the road is rough or not. If the detecting means concludes that the road is rough, the aforementioned control of the steering characteristic should preferably be interrupted.

According to the foregoing embodiment, the respective damping forces of the switching actuators $22_R$ and $22_F$ and the supply/discharge times for the actuators $21_R$ and $21_F$ are determined by the vehicle velocity V and the steering angular velocity $\theta_{HA}$, as seen from FIGS. 5 and 6. These damping forces and supply/discharge times may, however, be determined on the basis of the actual transverse acceleration $G_A$ of the vehicle body in place of the steering angular velocity $\theta_{HA}$. In controlling the steering characteristic of the motor vehicle, however, the steering angular velocity $\theta_{HA}$ should preferably be used for the purpose, in consideration of the control response characteristic.

It is to be understood, moreover, that the present invention may be applied to hydraulic active suspensions, as well as to the air suspension system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A suspension control system of a motor vehicle running on a road, said motor vehicle having a vehicle body, front wheels, and rear wheels, said system comprising:

suspensions for connecting the vehicle body with the wheels, including a front group of front-wheel suspensions providing a front roll stiffness on the front side of the vehicle body, and a rear group of rear-wheel suspensions providing a rear roll stiffness on the rear side of the vehicle body;

detecting means for detecting movement states of the vehicle body and outputting respective detection signals;

first output means for calculating a total roll stiffness of the whole vehicle body in response to the detection signals from the detecting means and delivering a first control signal, indicative of required front and rear roll stiffnesses in accordance with a result of the calculation of the first output means;

arithmetic means for calculating a first state variable indicative of a flexure degree of the road and a second state variable indicative of a gradient of the road in accordance with the detection signals from the detecting means and outputting the results of the calculation of the arithmetic means;

second output means for delivering a second control signal to the control means in accordance with the calculation results from the arithmetic means to vary the front and rear roll stiffnesses, thereby modifying a steering characteristic of the motor vehicle; and control means for independently controlling the front and rear roll stiffnesses provided by the front and rear groups of suspensions in accordance with the first control signal and the second control signal.

2. A system according to claim 1, wherein said second control signal is for discriminating the front and rear roll stiffnesses for a predetermined period of time.

3. A system according to claim 2, wherein said second control signal is further for holding the steering characteristic of the motor vehicle to an under-steering condition for a predetermined period of time.

4. A system according to claim 2, wherein said second control signal is further for holding the steering characteristic of the motor vehicle to an over-steering condition for a predetermined period of time.

5. A system according to claim 2, wherein said second control signal is further for holding the steering characteristic of the motor vehicle to a neutral-steering condition for a predetermined period of time.

6. A system according to claim 1, wherein said detecting means includes a first sensing means for detecting a steering angular velocity of the motor vehicle, and for outputting a steering angular velocity signal, and said first output means calculates the total roll stiffness of the whole vehicle body in accordance with the output steering angular velocity signal, and delivers the first control signal to the control means in accordance with the result of the calculation the first output means.

7. A system according to claim 1, wherein said detecting means includes a second sensing means for detecting a transverse acceleration of the motor vehicle, transversely acting on the vehicle body, and outputting a transverse acceleration signal, and said first output means calculates the total roll stiffness of the whole vehicle body in accordance with the transverse acceleration signal, and delivers the first control signal to the control means in accordance with the result of the calculation of the first output means.

8. A system according to claim 1, wherein each said suspension includes an adjusting device for adjusting a damping force thereof, and said control means varies the front and rear roll stiffnesses by independently adjusting front and rear damping forces provided by the front and rear groups of suspensions.

9. A system according to claim 1, wherein each said suspension includes an adjusting device for adjusting a supporting force thereof, and said control means varies the front and rear roll stiffnesses by independently adjusting front and rear supporting forces provided by the front and rear groups of suspensions.

10. A system according to claim 1, wherein said detecting means includes a first sensing means for detecting a steering angle of the motor vehicle, and outputting a steering angle signal, and a second sensing means for detecting a transverse acceleration of the motor vehicle, transversely acting on the vehicle body, and outputting a transverse acceleration signal, and said arithmetic means calculates the first state variable indicative of the flexure degree of the road in accordance with the steering angle signal and the transverse acceleration signal.

11. A system according to claim 1, wherein said detecting means includes a first sensing means for detecting a throttle opening of an engine of the motor vehicle, a second sensing means for detecting an engine speed, and a third sensing means for detecting a longitudinal acceleration of the motor vehicle, longitudinally acting on the vehicle body, the first, second, and third sensing means outputting a throttle opening signal, an engine speed signal and a longitudinal acceleration signal, respectively, and said arithmetic means calculates an engine output in accordance with the output throttle opening signal and the output engine speed signal, and further calculates the second state variable indicative of the gradient of the road in accordance with the calculated engine output and the output longitudinal acceleration signal.

12. A system according to claim 1, wherein said second output means outputs a second control signal obtained by fuzzy inference in accordance with the first and second state variables from the arithmetic means, indicative of the flexure degree and the gradient of the road, respectively, the second control signal varying the front and rear roll stiffnesses for a predetermined period of time.

13. A method for controlling suspensions of a motor vehicle traveling on a road, the motor vehicle including a vehicle body, front wheels, and rear wheels, the suspensions connecting the vehicle body with the wheels and including a front group of front wheel suspensions providing a front roll stiffness on the front side of the vehicle body and a rear group of rear-wheel suspensions providing a rear roll stiffness on the rear side of the vehicle body, the method comprising the steps of:

(a) detecting movement states of the vehicle body and outputting respective detection signals;

(b) calculating a total roll stiffness of the whole vehicle body in response to the output detection signals;

(c) outputting a first control signal indicative of required front and rear roll stillnesses in accordance with the calculation of step (b);

(d) calculating a first state variable, indicative of a flexure degree of the road, in accordance with the detection signals;

(e) calculating a second state variable, indicative of a gradient of the road, in accordance with the detection signals;

(f) outputting a second control signal, in accordance with the calculations of steps (d) and (e), to vary the front and rear roll stiffnesses, thereby modifying a steering characteristic of the motor vehicle; and (g) controlling, independently, the front and rear roll stiffnesses provided by the front and rear groups of suspensions in accordance with the output first control signal and the output second control signal.

14. The method of claim 13, wherein the second control signal output in step (f) is for discriminating the front and rear roll stiffnesses for a predetermined period of time.

15. The method of claim 14, wherein the second control signal output in step (f) is further for holding the steering characteristic of the motor vehicle to an under-steering condition for a predetermined period of time.

16. The method of claim 14, wherein the second control signal output in step (f) is further for holding the steering characteristic of the motor vehicle to an over-steering condition for a predetermined period of time.

17. The method of claim 14, wherein the second control signal output in step (f) is further for holding the steering characteristic of the motor vehicle to a neutral-steering condition for a predetermined period of time.

18. The method of claim 13, wherein step (a) includes detecting a steering angular velocity of the motor vehicle and step (c) includes calculating the total roll stiffness in accordance with the detected steering angular velocity.

19. The method of claim 13, wherein step (a) includes detecting a transverse acceleration of the motor vehicle, transversely acting on the vehicle body, and step (c) includes calculating the total roll stiffness in accordance with the detected transverse acceleration.

20. The method of claim 13, further comprising the step of:

(h) adjusting a damping force of the suspension, wherein said step (g) includes varying the front and rear roll stiffnesses by independently adjusting front and rear damping forces provided by the front and rear groups of suspensions.

21. The method of claim 13, further comprising the step of:

(h) adjusting a supporting force of the suspension, wherein said step (g) includes varying the front and rear roll stiffnesses by independently adjusting front and rear supporting forces provided by the front and rear groups of suspensions.

22. The method of claim 13, wherein step includes the substeps of:

a(i) detecting a steering angle of the motor vehicle and outputting a steering angle signal; and a(ii) detecting a transverse acceleration of the motor vehicle, transversely acting on the vehicle body and outputting a transverse acceleration signal, and step (d) includes calculating the first state variable indicative of the flexure degree of the road in accordance with the output steering angle signal and the output transverse acceleration signal.

23. The method of claim 13, wherein step (a) includes the substeps of:

a(i) detecting a throttle opening of an engine of the motor vehicle and outputting a throttle opening signal, a(ii) detecting a speed of the engine and outputting an engine speed signal, and a(iii) detesting a longitudinal acceleration of the motor vehicle, longitudinally acting on the vehicle body, and outputting a longitudinal acceleration signal, and step (e) includes the substeps of, (e)(i) calculating an engine output in accordance with the output throttle opening signal and the output engine speed signal, and (e)(ii) calculating the second state variable indicative of the gradient of the road in accordance with the calculated engine output and the output longitudinal acceleration signal.

24. The method of claim 13, wherein step (f) includes outputting a second control signal obtained by fuzzy inference in accordance with the calculations of steps (d) and (e), wherein the output second control signal varies the front and rear roll stiffnesses for a predetermined period of time.

* * * * *